United States Patent [11] 3,542,463

[72] Inventor Robert A. Klein
 Skokie, Illinois
[21] Appl. No. 711,427
[22] Filed March 7, 1968
[45] Patented Nov. 24, 1970
[73] Assignee Bell & Howell Company
 Chicago, Illinois
 a corporation of Illinois

[54] TRANSPARENCY POSITIONER FOR PROJECTOR STAGE
 6 Claims, 3 Drawing Figs.
[52] U.S. Cl. ................................................ 353/122;
 33/180; 353/66
[51] Int. Cl. ............................................. G03b 21/00
[50] Field of Search .......................................... 355/72, 74;
 353/37, 50, 66, 73, 77, 122, 22; 33/184.5, 180A,
 181, 189, 174TB; 269/315

[56] References Cited
UNITED STATES PATENTS

| | | | |
|---|---|---|---|
| 1,883,628 | 10/1932 | Dreifuss ........................ | 33/76 |
| 2,983,049 | 5/1961 | Andrisani ..................... | 33/184.5 |
| 3,267,801 | 8/1966 | Abbott et al. ................. | 353/24 |
| 3,342,101 | 9/1967 | Zollner ......................... | 353/66X |
| 3,381,554 | 5/1968 | Ploch et al. .................. | 33/184.5X |

Primary Examiner—William D. Martin, Jr.
Attorney—William F. Pinsak and John E. Peele Jr.

ABSTRACT: A transparency positioner is provided for locating the center of any of several sizes of transparencies substantially over the optical center of an overhead projector stage. The positioner has "L"-oriented legs, in one of which legs, aligning holes are provided to enable selective positioning of the positioner on locators secured in the stage for proper positioning of the size of transparency to be projected.

Patented Nov. 24, 1970
3,542,463
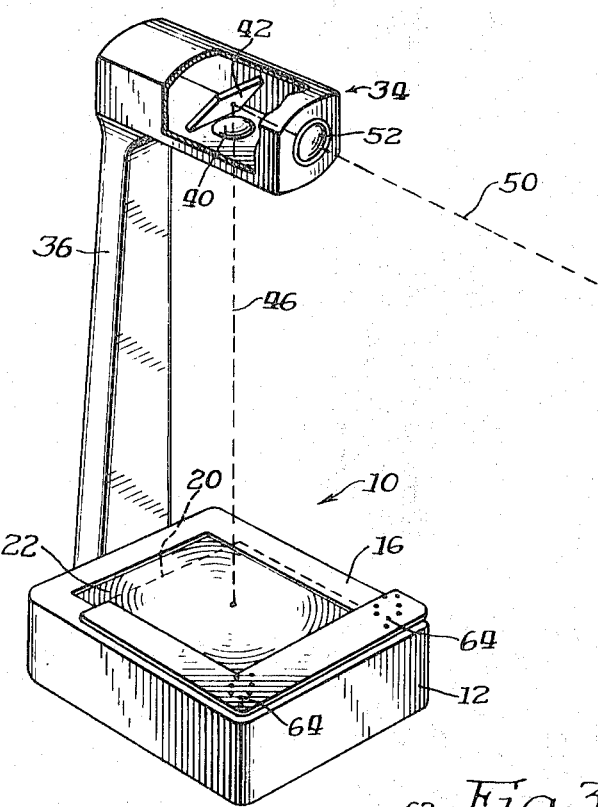
Fig.1.
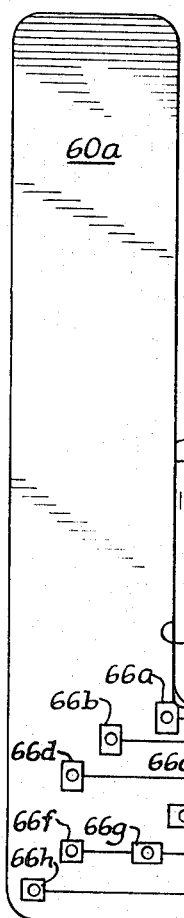
Fig.2.
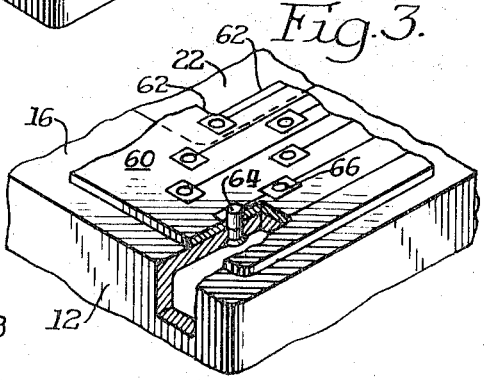
Fig.3.
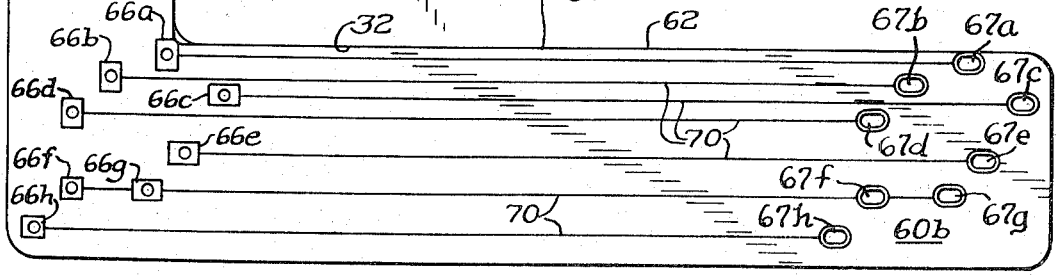
Inventor
Robert A. Klein
By William F. Russell
        Attys

TRANSPARENCY POSITIONER FOR PROJECTOR STAGE

This invention relates to a work organizer adapted for use on an overhead projector stage, and particularly relates to structure for properly positioning transparencies on the stage.

Overhead projectors have gained much popularity in schools and businesses because they permit the user to project large sized transparencies. These transparencies have the advantage that the can be prepared "on-the-spot". After preparation these transparencies, with or without mounts or frames, are placed on the stage of an overhead projector. Usually, an image receiving surface such as a screen is positioned before the audience to receive an image projected from the transparency. However, because of the lack of a work organizer, such as a transparency positioner, the transparencies are often projected so that their image falls outside the area defined by the screen. Other transparencies may be skewed with respect to horizontal and vertical alinement relative to the edges of the screen. Still other transparencies may be substantially offcenter of the screen. Further, when different sized transparencies are used, the alinement from one size to another may shift back and forth over the screen. Such errors in projection, whether or not corrected, disturb the concentration of the audience.

The transparency positioner of the present invention is constructed as an L-shaped plate having a plurality of alining openings in one of the legs of the L. These openings are spaced relative to the interior edge of the leg so that the locator may be variably positioned relative to locators on the stage of the optical apparatus. By properly orienting the positioner, a transparency to be positioned on the stage an be abutted against the inner edges of the positioner, and therefore properly alined relative to the optical center of the stage. By adjusting the positioner so that other sets of aliners seat on the locators fixed to the state, other sizes of transparencies may be just as easily and properly oriented on the stage.

With the instant positioner, the projectionist can continually face the audience while accurately positioning each of several transparencies. The image is alined both vertically and horizontally without requiring extreme care in locating the transparency.

Thus, an object of the present invention is to provide a transparency positioner device to properly orient transparencies on the stage of an overhead projector.

Another object of the invention is to provide a transparency positioner adapted for selective orientation on the stage of an overhead projector so as to aid in properly alining any of several sizes of transparencies on the stage.

Still another object is to provide a transparency positioner having a pair of legs, in one of which are a plurality of alining means intended to cooperate with locators on the projector stage whereby transparencies are accurately positioned.

Further and other objects will be apparent from the following description when read with the accompanying drawings in which like numerals refer to like parts.

In the drawings:

FIG. 1 is a perspective view of an optical apparatus having a transparency positioner positioned on the stage thereof;

FIG. 2 is an enlarged plane view of the positioner, and a typical transparency shown segmentally; and FIG. 3 is an enlarged perspective view in partial section disclosing details of the locator and aliners on the stage of the apparatus.

Referring to FIG. 1, an optical instrument 10, such as an overhead projector, is shown. This preferred embodiment of the instrument has a base 12, adapted to contain a light source (not shown). The substantially horizontal upper surface of base 12 is defined as a stage 16 on which a transparency 20 is positionable. The operative portion of the stage is formed of a transparent plate 22, made of glass or plastic, and supported over an opening in the base through which light passes to and through transparency 20. Usually, this plate 22 is formed of a Fresnel lens to concentrate the light rays so as to better illuminate the full dimensions of transparency 20.

A typical transparency 20, seen segmentally in FIG. 2, is prepared by forming an opaque image 26 on an otherwise transparent image support material 28. Although this support material may be laid directly on plate 22, in this preferred embodiment, the support material 28 is shown mounted in frame 30, having edges 32. This frame enables the operator or user of the instrument to move the transparency to and from stage 16 without touching the to-be-projected image area thereof. Commercially, frames are available in but a few predetermined rectangular configurations insofar as their outside dimensions are concerned. The frames may have many interior configurations. However, the exterior dimensions usually center the image support material so that the central image portion is substantially over the center of plate 22 when the transparency is correctly positioned on the stage.

In FIG. 1, a projection head 34 is seen supported above stage 16 of the projector by an upright post 36. For purposes of illustration only, since many head configurations are to be found in the market place, the head is defined by at least one image projecting objective 40, and a mirror 42. The optical axis of projection head 34 is generally alined with a vertical optical path 46, which extends from substantially the center of plate 22 and stage 16. As the image passes into head 34 either through objective 40 or an aperture in its place, the image is reflected by mirror 42 to exit from the head substantially horizontally along optical path 50. Mirror 42 may either receive an image focused by objective 40 and reflect that image through an image exit opening 52 in the head, or it may receive a substantially nonfocused image through an opening in place of objective 40 and reflect it through an objective located at 52. Obviously, objectives may be incorporated in both the position of objective 40 and objective 52. After the image exits along optical path 50, it is projected onto a screen or other image receiving surface (not shown).

A transparency positioner 60 is proposed to ensure alinement of the center of transparency 20 over the optical center of stage 16. Near the periphery of stage 16 and adjacent plate 22, a pair of locators, such as pins 64, are fixed in the stage and spaced a predetermined distance one from another. The positioner is preferably formed as a plate of sheet material defining a pair of legs 60a, 60b oriented in L fashion, and particularly defining a pair of interior edges 62, angled perpendicularly one to another. Typically, this sheet material may be any of the substantially rigid plastic materials not subject to deformation by the heat transmitted from the projection lamp of the apparatus. In one of the legs, a plurality of pairs of aliners, such as holes 66a–h, 67a–h are formed. The holes defining each pair of aliners are spaced from one another a distance substantially equal to the spacing between the locator pins 64. In this preferred embodiment one hole of each pair is circular, and of a dimension to seat snugly on the appropriate pin 64. The other hole is formed as a small oval to enable quick orientation of the positioner on the pins 64 which extend upwardly from the stage. The slight oversize of this latter hole also permits interchange of the organizer on various projectors which may not have the precise pin alinement required if only two circular holes were used.

Each pair of holes 66a–h, 67a–h disclosed as connected by a line 70, is formed so as to orient the positioner to properly position a transparency having a particular external configuration. Typically, the preferred embodiment provides for alinement of transparencies having the following external dimensions: (in inches)

12 x 10½
11 x 9
10½ x 12
10 x 8
9 x 11
8 x 8
8 x 10
7 x 7

Obviously, other transparency sizes may be taken into consideration and holes prepared therefor. To prepare such other holes, the transparency is positioned with its center over the optical center of plate 22. Positioner 60 is then oriented to bring interior edges 62 into engagement with the edges of the transparency. The holes may then be formed in the leg 60b of the positioner for alinement on locator pins 64. The operator can then project this size transparency as readily as the prepared sizes of transparencies.

From the description of the foregoing embodiment of the invention it will be seen that a transparency positioner is provided which ensures proper positioning of a transparency over the optical center of an overhead projector stage. In use, the operator merely determines the external size of the transparency to be used. Next, he orients the positioner to seat the proper holes over the pins on the stage. A series of transparencies of a given external configuration may then be placed with their edges in abutting relation with the interior edge of the positioner wherein their respective centers will be substantially alined over the optical center of the stage. When a new transparency size is to be used, the operator needs only to determine its size, and reorient the positioner before proceeding.

It is to be understood that the embodiment shown is illustrative of the principal operation of a transparency positioning device and that certain changes, alterations, modifications or substitutions may be made to the structure of the device without departing from the spirit and scope of the invention as set forth in the appended claims.

I claim:

1. A transparency positioner for use with an overhead projector having a projection stage, the positioner being usable to orient different sized transparencies on the stage, the positioner comprising:
   a plate member having a pair of leg portions in L orientation, said leg portions having predetermined internal edges; and
   at least two pair of aliners in one of said leg portions to cooperate with a fixed pair of locators on said stage wherein a particular sized transparency is substantially alined over the optical center of said stage when one of said pair of aliners cooperates with said locators to orient said positioner, and to orient a transparency when said transparency substantially abuts both said internal edges of said positioner.

2. A positioner as in claim 1, wherein said aliners are holes, and said locators are pins extending above the stage, said holes cooperating with said pins to orient said positioner on the stage.

3. A positioner as in claim 1 wherein said aliners are positioned in said leg portion relative to said internal edge of said positioner wherein both said interior edges are oriented to predetermined positions relative to said optical center of stage.

4. A positioner as in claim 3 wherein said interior edges of said legs are oriented perpendicular to one another.

5. A positioner as in claim 1 wherein said aliners of each pair are spaced apart the same distance, and said locators on said stage are spaced apart an equal distance.

6. In combination with an overhead projector having a stage on which a substantially rectangular transparency is positionable for projection, the invention comprising:
   at least a pair of spaced alining pins secured in said stage and extending upwardly therefrom; and
   a transparency positioner locatable on said stage; said positioner being formed of sheet material with a pair of legs, the inner edges of which legs are perpendicular to one another, and having at least a pair of equally spaced holes in one of said legs for positioning over said pins on said stage; said spaced holes being formed in said positioner wherein engagement of the edges of said rectangular transparency on the edges of the positioner causes alinement of the center of said transparency substantially over the optical center of the stage.